United States Patent Office 3,142,665
Patented July 28, 1964

3,142,665
NOVEL TETRAFLUOROETHYLENE RESINS AND THEIR PREPARATION
Anthony John Cardinal, Parkersburg, and William Lee Edens, Vienna, W. Va., and John William van Dyk, Wilmington, Del., assignors to E. I. du Pont de Nemours and Company, Wilmington, Del., a corporation of Delaware
No Drawing. Filed July 26, 1960, Ser. No. 41,711
11 Claims. (Cl. 260—92.1)

This invention relates to a class of particulate tetrafluoroethylene resins, comprising at least 98 weight percent combined tetrafluoroethylene, predominantly comprising spheroidal particles 0.05 to 0.5 micron in diameter, having an average particle diameter in the range of 0.12 to 0.35 micron, a standard specific gravity of less than 2.235 and a specific melt viscosity of greater than $1 \times 10^{-9}$ poises at 380° C., hereinafter referred to as high molecular weight dispersion resins.

Resins having the aforesaid characteristics are commercially available as aqueous colloidal dispersions, obtained by polymerizing tetrafluoroethylene in media consisting essentially of water, initiator and dispersing agent, and as "fine powders," obtained by coagulating such dispersions under low shear stress conditions. The resins are useful in the manufacture of thin-walled articles. Thus the dispersions as such are used for impregnating, casting and coating, usually followed by sintering to coalesce the resin particles. The "fine powders" are used in the fabrication by paste extrusion techniques of continuous thin-walled articles such as wire coatings, tapes, films, tubes, pipes and the like. The articles are valuable by reason of their outstanding resistance to weather, heat, friction, electricity, chemicals and mechanical stress.

In paste extrusion, fine powder is blended with lubricant to form a pasty mass which is charged to an extruder barrel and extruded through a die of reduced cross-sectional diameter. The resulting extrudate is then usually heated and sintered to remove lubricant and coalesce the residual resin into an integral mass. High molecular weight dispersion resins have hitherto been unsatisfactory in a number of paste extrusion applications, owing to their tendency to develop shear faults when extruded at high reduction ratios, i.e., under conditions where the cross-sectional area of the extruder barrel is relatively large in comparison to the cross-sectional area of the extruded article. For this reason, such resins have not hitherto been suitable for standardized paste extrusion at reduction ratios of 1600 to 1 or more, and moreover, have tended to develop an undesirable number of flaws, even at lower reduction ratios, when extruded into articles of considerable length.

According to the present invention, there are provided new high molecular weight dispersion resins obtained by polymerizing tetrafluoroethylene in an aqueous medium consisting essentially of water, initiator, and dispersing agent, distinguished in that the medium also contains, at least during the polymerization of the final 30% of the tetrafluoroethylene polymerized, a modifier effective to maintain the overall rate of polymerization at least 5 percent below that obtaining for the polymerization of an equal quantity of tetrafluoroethylene in an identical reaction medium continuously saturated with tetrafluoroethylene at the same temperature and pressure in the absence of said modifier, said modifier consisting of one or more members of the group consisting of water-soluble non-polymerizable chain transfer agents containing at least one covalently-bound non-metallic monovalent atom other than fluorine, perfluoroalkyl-trifluoroethylenes of 3 to 10 carbon atoms, and oxyperfluoroalkyl-trifluoroethylenes of 3 to 10 carbon atoms.

The new resins have not only the advantageous characteristics of earlier high molecular weight dispersion resins, but also improved paste extrudability. In specific aspects they are further characterized by a narrow particle size distribution such that $\Delta d \frac{1}{2} / d_{av}$, the ratio, to average particle diameter, of the spread in particle diameters at the half-peak concentrations of particle sizes by weight, is less than 0.40; by a distribution of molecular weight along the particle radii such that the ratio of molecular weight of the shell half to the molecular weight of the core half of the particles is less than 3.5; or by the presence of very small amounts, in the range of 0.01 to 0.3 weight percent, of combined perfluoroalkyl- or oxyperfluoroalkyl-trifluoroethylene in at least the outer 30 weight percent of the resin particles as determined by infrared measurement; or by a combination of two or more such features. In preferred aspects they are capable of being paste extruded at reduction ratios of at least 1600 to 1.

In the preparation of the new resins the procedures used are basically those hitherto known to produce high molecular weight dispersion resins. The aqueous medium containing initiator and dispersing agent is charged to an evacuated stirred reactor and continuously pressured with tetrafluoroethylene until the desired quantity of dispersion resin is obtained. The same ranges of temperature, pressure, choice of initiator and dispersing agent, type of reactor and proportions of ingredients are employed. The use of a modifier in accordance with the present invention is effective in aqueous media continuously saturated with tetrafluoroethylene to reduce the overall reaction rate by at least 5 percent and preferably not more than 50 percent without concomitantly causing a change in the fundamental classification of the resin produced. The relative rates in the presence and absence of modifier referred to are the average rates obtained in polymerizing equal quantities of tetrafluoroethylene in identically constituted aqueous media at the same temperature and pressure. Comparisons made in this way provide a measure of the inhibiting effect of the modifier. In the actual practice of the present invention, however, the stirring provided may be insufficient to maintain the reaction medium continuously saturated with respect to monomer, and the overall reaction rate will be correspondingly limited. Under such conditions, the presence of the modifier in accordance with the invention may occasion little or no change in the observed overall reaction rate, but is nevertheless essential and operable to produce the desired new resins.

Advantageously, when operating under conditions such that the presence of modifier does produce an observable decrease in reaction rate, highly active initiators are used at relatively low temperatures in order to obtain maximum reaction rates consistent with the retention of a high level of molecular weight. Thus, in the systems under consideration, active initiators such as ammonium or potassium persulfate at low temperature appear to provide equally good chain initiating and chain propagating activity, but concomitantly less chain terminating activity, as compared with less active initiators such as disuccinic acid peroxide at higher temperature, with the net effect that higher overall polymerization rates are achieved. The retardation of rate which may be occasioned by the use of modifiers in accordance with the present invention can thus be counterbalanced by the use of active initiators at low temperature, so that economical overall rates are obtained.

The chain transfer agents which may be used as modifiers in accordance with the present invention contain covalently-bound hydrogen or halogen other than fluorine, are soluble in the aqueous reaction medium under polymerization conditions, and are not copolymerizable with tetrafluoroethylene under the reaction conditions.

To facilitate their use in proper amounts, they are preferably liquids of moderate chain transfer activity, soluble in the reaction medium over a broad range of temperatures and pressures. Methanol is especially preferred. Examples of other effective chain transfer agents include hydrogen, methane, ethane, propane, propylene, carbon tetrachloride, dichlorotetrafluoroethane, bromoform, acetone and propionic acid. The use of chain transfer agents as sole modifiers in accordance with the present invention provides resins of exceptionally good thermal stability.

Perfluoroalkyl- and oxyperfluoroalkyl-trifluoroethylenes of 3 to 10 carbon atoms may be used as modifiers in accordance with the present invention either alone to provide resins having outstanding flexural properties, or together with a chain transfer agent to provide resins which are paste extrudable at very high reduction ratios, on the order of 10,000/1 or more. The lower-carbon trifluoroethylenes are preferred for optimum heat aging and paste extrudability properties; hexafluoropropylene is especially preferred for optimum sintering characteristics.

The proportions or modifier employed will vary widely in accordance with the activity of the particular modifier chosen, and also with the temperature and pressure. With normally gaseous modifiers the minimum amounts required to obtain effective rate limiting capacity ordinarily range from about 0.1 part per million with a highly active modifier such as propane to 10,000 parts per million for a very mildly active modifier such as pentafluoroethane. Correspondingly, with normally liquid modifiers, these amounts ordinarily are in the range of 10 to 5000 parts per million, based on the weight of the aqueous medium. However, amounts larger than these minima, in instances up to 30,000 parts per million or more based on monomer, may also be employed.

The modifiers may effectively be incorporated into the reaction mixture when about 70 percent of the total quantity of the tetrafluoroethylene to be polymerized has reacted, or at any earlier stage of the reaction. Presence of modifiers throughout the polymerization reaction favors a narrow particle size distribution, and therefore somewhat better paste extrudability. Presence of modifier only during polymerization of the final 30 percent of tetrafluoroethylene on the other hand favors a higher overall reaction rate. Except as effective modifier is present during this final stage of the reaction, however, the benefits of the present invention are not obtained. It is believed that the presence of the modifier during this stage counterbalances the tendency for the growing particles to develop very long-chain, highly crystalline shells.

While the reaction medium of the present invention consists essentially of water, initiator, dispersing agent and modifier, various other ingredients may also be present without deleterious results as hitherto known in the art. The charge thus preferably includes a saturated hydrocarbon wax, which is not active as a chain transfer agent, to facilitate the preparation of non-agglomerated dispersions of high solids content. Similarly, when it is desired to prepare resins which manifest a lower paste extrusion pressure, the reaction medium may be seeded with pre-made colloidal particles of polytetrafluoroethylene, which favors the production of large particles, at some expense in the uniformity of particles size distribution.

The proportion of spheroidal particles, the average particle diameters, and the distribution of particle sizes by weight as referred to herein may be determined directly by examination of photographs of samples under the electron microscope at 20,000 diameters magnification. The average particle diameter ($d_{av}$) may also be determined indirectly by a relationship based on light-scattering theory, from the percentage of incident light transmitted at 546 millimicron wave length through a unit measure of a dilute dispersion (ca. 0.02 weight percent solids), corrected to accord with the values obtained via the electron microscope. The distribution of particle sizes by weight may also be determined indirectly by an ultra-centrifuge analysis of dispersion in which a photograph representing the changes of refractive index (RI) across the boundary region between the aqueous medium and the bulk of colloidal dispersion particles of polytetrafluoroethylene sedimenting under the influence of centrifugal force is analyzed using a travelling microscope. These changes in RI are converted to changes in weight concentration across the boundary on the assumption that the specific refractive index increment for the dispersion particles relative to the aqueous medium is independent of particle size. By applying Stokes' relationship and assuming that all particles are spherical and of density 2.295 g./cc., differential distribution as a function of particle size is obtained, and corrected if necessary to accord with the weight distribution curve derived from an analysis of photographs taken with the electron microscope. A horizontal line is drawn which bisects the maximum ordinate of the distribution curve so obtained. The difference, $\Delta d\frac{1}{2}$, between the abscissa values, in microns, of the two intersections of this line with the curve, divided by the weight-average particle size, $d_{av}$, also in microns, is a convenient measure of the relative width of the particle size distribution. Resins having a ratio, $\Delta d\frac{1}{2}/d_{av}$, of less than 0.40 are preferred.

The standard specific gravity (SSG) of the resins discussed herein is determined by the ratio of weight in air to weight of an equal volume of water, at 23° C. of a specimen prepared in a standard manner. In the standard specimen preparation, a 3.5 gram sample of dry resin powder is leveled between aluminum foils, in a cylindrical mold 2.73 cm. in diameter, and pressure is gradually applied during about 30 seconds to a final pressure of about 352 kg./cm.$^2$, which is held for two minutes. The resulting preform is baked in an air oven at 380° C. for 30 minutes, cooled to 300° C. at a rate of 1° C. per minute, removed from the oven, and then conditioned for 3 hours at 23° C. The standard specific gravity so obtained is a rough measure of average molecular weight. In the case of tetrafluoroethylene resins prepared in the absence of modifier or in the presence of chain transfer agent as the sole modifier, empirical correlations from kinetic considerations indicate the relationship $SSG = 2.612 - 0.582 \log_{10} \overline{M}_n$, where $\overline{M}_n$ is the number average molecular weight.

The shell-to-core ratio of number-average molecular weight $$\left(\frac{\overline{M}_{n_s}}{\overline{M}_{n_c}}\right)$$

as discussed herein is calculated from the $\overline{M}_n$ of the half made resin and the $\overline{M}_n$ of the final resin determined from SSG by the foregoing correlation. The $\overline{M}_n$ of the half-made resin (core half) is determined either on a sample withdrawn from the polymerization reaction when the total weight of solids in the dispersion is half that the total weight of solids in the final dispersion, or upon a sample made under the same conditions as the final resin, except that the reaction is terminated when the total weight of solids is only half as great. $\overline{M}_{n_s}$ (shell half) is then determined from the correlation $\overline{M}_{n_s} = 2\overline{M}_n - \overline{M}_{n_c}$. Resins having a value of $$\left(\frac{\overline{M}_{n_s}}{\overline{M}_{n_c}}\right)$$

of less than 3.5 are preferred.

The specific melt viscosity at 380° C. ($MV_{sp}$) as discussed herein is a value in poises determined from the rate at which a sample of resin extrudes under a shear stress of $4.5 \times 10^5$ dynes/cm.$^2$, by the procedure disclosed in Belgian Patent 560,454, granted September 14, 1957.

The combined hexafluoropropylene content as discussed herein is a weight percent value obtained by infra-red absorbance. The value is the produce of 0.3 and the ratio of absorbance in the infra-red, of a cold-pressed sample of the resin 0.05 cm. thick, at 10.18 microns to the infra-red absorbance of the same sample at 10.7 microns. To determine the hexafluoropropylene content in the shell portion of the resin particles, the hexafluoropropylene content of the core portion is determined and compared with the hexafluoropropylene content of the final resin, in the manner described above for determination of the shell-to-core relationship of molecular weight.

The paste extrusion performance (EP) of various resins as discussed herein is determined by a standardized procedure wherein 81 parts by weight of fine powder are admixed with 19 parts by weight of a hydrocarbon lubricant, predominantly comprising decane and undecane, and having a viscosity of about 1.36 centipoises at 25° C. and a boiling range of 175–208° C. The mixture is rolled at 30 r.p.m. for 20 minutes in a cylindrical vessel, having a water capacity of about 500 parts, to effect blending. The blend is compacted under hand pressure into a cylinder 3.16 cm. in internal diameter, and from thence extruded at 30° C., and at a uniform rate of 23.5 grams per minute, through a die conically tapering at an apex angle of 60° to a cylindrical orifice 0.08 cm. in internal diameter, and 0.038 cm. in axial length. The quality of the extrudate is visually rated as "F" for discontinuous extrudate and from 0 to 10 for continuous extrudate of from very poor to excellent regularity and freedom from flaws. Pressure required is also recorded and is preferably in the range of 250 to 1000 kg./sq. cm.

The invention is more particularly illustrated and explained by means of the following comparisons and examples, which are not intended to be limiting. In the examples and comparisons all parts and percentages are by weight except as otherwise noted. In the examples, APS is ammonium persulfate, KPS is potassium persulfate; DSP represents disuccinic acid peroxide, $$(HOOCCH_2CH_2CO_2)O_2$$

used together with 2 parts per million of powdered iron based on the water charged; $C_8APFC$ is a mixture of 8-carbon ammonium perfluorocarboxylate predominantly comprising ammonium perfluorocaprylate; $C_9AFC$ is the ammonium salt of 9-H hexadecafluorononanoic acid; HFP is hexafluoropropylene; and PPTE is n-perfluoropropoxy trifluoroethylene, $CF_3CF_2CF_2OCF=CF_2$. In all of the examples, the resins comprised at least 98 weight percent combined tetrafluoroethylene, showed specific melt viscosities of greater than $1 \times 10^9$ poises as measured at 380° C. and predominantly comprised spheroidal particles 0.05 to 0.5 micron in diameter, with a $d_{av}$ in the range of 0.12 to 0.35$\mu$.

Except as otherwise specified, the values given for average dispersion particle size are uncorrected results obtained by the aforementioned light-transmission analysis based on an assumed value of 0.020 cc./g. for the refractive index increment of colloidal particles of polytetrafluoroethylene dispersed in an aqueous medium at 25° C. The values so reported differ from the average particle sizes determined from electron microscope photographs or by ultra-centrifuge analysis by about −20 to +30% depending on the degree to which the actual refractive index increment is different from 0.020 cc./g. and on the degree of agglomeration of the colloidal particles in the dispersion.

EXAMPLES 1 TO 12

A horizontally-disposed, water-steam jacketed, cylindrical stainless steel autoclave, having a paddlewheel agitator running the length of the autoclave, and having a length-to-diameter ratio of about 10 to 1 and a water capacity of 3900 parts, is evacuated, charged with 1500 parts of demineralized deoxygenated water, and with desired concentrations of dispersing agent and initiator based on the weight of the water. The liquid modifier is charged in the indicated concentration in percent by weight, based on water, to the aqueous phase and is present throughout the reaction. The charge is then pressured with about 2 atmospheres of tetrafluoroethylene, stirred at 125 r.p.m. to keep the aqueous phase saturated with tetrafluoroethylene, heated to desired reaction temperature, and further pressured to 28.2 atmospheres absolute with tetrafluoroethylene. Stirring and temperature are then maintained until reaction commences, as evidenced by a drop in pressure, and then further maintained, while continuously maintaining pressure at 28.2 atmospheres absolute with additional tetrafluoroethylene, until a dispersion of desired solids content is obtained. The resulting dispersion is discharged and cooled, after which supernatant solid wax is removed, and the residue is diluted and coagulated by the procedure of J. F. Lontz U.S. Patent 2,593,583, issued April 22, 1952. Samples of the products are lubricated and extruded to determine standard paste extrusion performance (EP). Results are summarized in Table I.

*Table I*

| Example No. | Initiator Kind | Initiator Percent | Reaction Temperature, °C. | Dispersing Agent Kind | Dispersing Agent Percent | Percent Modifier* | Percent Wax | Overall Reaction Rate, g./liter/hour | Percent Solids in Dispersion | $d_{av}$ | SSG | Extrusion Pressure, kg./cm.² | Extrudate Quality |
|---|---|---|---|---|---|---|---|---|---|---|---|---|---|
| 1 | APS | 0.048 | 50 | $C_8APFC$ | 0.15 | 0.01 | 6.3 | 337 | 35.2 | 0.161 | 2.218 | 660 | 6 |
| 2 | APS | 0.006 | 60 | $C_8APFC$ | 0.15 | 0.01 | 6.3 | 290 | 35.0 | 0.136 | 2.220 | 670 | 9 |
| 3 | APS | 0.012 | 60 | $C_8APFC$ | 0.15 | 0.01 | 6.3 | 396 | 40.5 | 0.130 | 2.221 | 730 | 6 |
| 4 | APS | 0.012 | 60 | $C_8APFC$ | 0.15 | 0.009 | 6.3 | 480 | 41.2 | 0.141 | 2.220 | 625 | 9 |
| 5 | APS | 0.012 | 60 | $C_8APFC$ | 0.15 | 0.02 | 6.3 | 205 | 36.9 | 0.145 | 2.234 | 610 | 8 |
| 6 | APS | 0.024 | 60 | $C_8APFC$ | 0.15 | 0.01 | 6.3 | 585 | 34.5 | 0.157 | 2.221 | 705 | 7 |
| 7 | APS | 0.006 | 60 | $C_9AFC$ | 0.15 | 0.009 | 6.3 | 550 | 39.7 | 0.185 | 2.206 | 465 | 9 |
| 8 | APS | 0.006 | 60 | $C_9AFC$ | 0.15 | 0.011 | 6.3 | 515 | 40.6 | 0.184 | 2.220 | 400 | 9 |
| 9 | APS | 0.009 | 60 | $C_9AFC$ | 0.15 | 0.010 | 6.3 | 510 | 40.3 | 0.179 | 2.212 | 420 | 10 |
| 10 | APS | 0.006 | 70 | $C_9AFC$ | 0.15 | 0.009 | 6.3 | 770 | 40.5 | 0.230 | 2.229 | 330 | 9 |
| 11 | DSP | 0.1 | 85 | $C_8APFC$ | 0.214 | 0.045 | 6.3 | 435 | 30.8 | 0.156 | 2.224 | 595 | 8 |
| 12 | DSP | 0.1 | 85 | $C_8APFC$ | 0.214 | 0.09 | 6.3 | 367 | 30.8 | 0.152 | 2.231 | 650 | 8 |

*Runs 1 to 10, methanol modifier. Runs 11 and 12, propionic acid modifier.

In comparison runs under identical conditions in the absence of modifier, it was found that identical quantities of high molecular weight dispersion resins were obtained at rates of from 1.2 to 2 times as great as in the examples, but that in each instance, the resins obtained yielded only fractured extrudates in the extrusion performance test.

EXAMPLES 13 to 23

The procedure of Examples 1 to 12 is repeated except that in these cases HFP modifier was premixed with the tetrafluoroethylene to be charged, in the concentration indicated in weight percent based on tetrafluoroethylene, and thus continuously charged to the reaction. Also, in Examples 17, 18, and 19, the concentrations of tetrafluoroethylene in the aqueous media were continuously maintained slightly below the saturation point. The results are summarized in Table II.

EXAMPLE 25

The general procedure of Examples 13 to 23 is repeated, but operating at less than saturated conditions, in a different reactor of somewhat larger size, having a Table II

| Example No. | Initiator Kind | Initiator Percent | Reaction Temperature, °C | Dispersing Agent Kind | Dispersing Agent Percent | Percent Modifier* | Percent Wax | Overall Reaction Rate, g./liter/hour | Percent Solids in Dispersion | $d_{av}$ | SSG | Extrusion Pressure, kg./cm.$^2$ | Extrudate Quality |
|---|---|---|---|---|---|---|---|---|---|---|---|---|---|
| 13 | DSP | 0.1 | 85 | C$_8$APFC | 0.15 | 0.15 | 6.3 | 523 | 35 | 0.170 | 2.205 | 455 | 8 |
| 14 | DSP | 0.1 | 85 | C$_8$APFC | 0.15 | 0.5 | 6.3 | 475 | 35 | 0.188 | 2.208 | 335 | 6 |
| 15 | DSP | 0.1 | 85 | C$_8$APFC | 0.15 | 0.75 | 6.3 | 441 | 35 | 0.160 | 2.202 | 455 | 10 |
| 16 | DSP | 0.1 | 85 | C$_8$APFC | 0.15 | ca. 0.75 | 6.3 | 350 | 35 | 0.160 | 2.209 | 365 | 9 |
| 17 | KPS | 0.005 | 85 | C$_9$AFC | 0.15 | 0.5 | 6.3 | 1,440 | 35 | 0.173 | 2.211 | 425 | 10 |
| 18 | KPS | 0.005 | 85 | C$_9$AFC | 0.15 | 0.1 | 6.3 | 1,430 | 35 | 0.158 | 2.232 | 505 | 10 |
| 19 | KPS | 0.005 | 85 | C$_9$AFC | 0.15 | 0.9 | 6.3 | 1,310 | 35 | 0.143 | 2.204 | 600 | 10 |
| 20 | KPS | 0.003 | 70 | C$_9$AFC | 0.15 | 0.5 | 6.3 | 658 | 35 | 0.156 | 2.176 | 540 | 7 |
| 21 | KPS | 0.003 | 70 | C$_9$AFC | 0.15 | 0.1 | 6.3 | 690 | 35 | 0.178 | 2.177 | 540 | 6 |
| 22 | KPS | 0.003 | 70 | C$_9$AFC | 0.15 | 0.9 | 6.3 | 503 | 35 | 0.158 | 2.184 | 515 | 10 |
| 23 | DSP | 0.1 | 85 | C$_8$APFC | 0.75 | 0.9 | 6.3 | 522 | 35 | 0.143 | 2.194 | 985 | 8 |

*Hexafluoropropylene (HFP)

In comparison runs under identical conditions in the absence of modifier, it was found that except under the conditions of Examples 17, 18, and 19, identical quantities of high molecular weight dispersion resins were obtained at rates of from 1.2 to 2 times as great as in the examples. Under the conditions of 17, 18, and 19 the rates were substantially unchanged in the absence of modifiers. In all comparison runs, the products yielded only fractured extrudates in the extrusion performance test. In further comparison runs under the identical conditions of Examples 17, 18, and 19 in which the aqueous charges were maintained continuously saturated with tetrafluoroethylene, reaction rates 1.2 to 1.5 times greater were obtained in the absence of modifiers, and these products also fractured in the extrusion performance test. Infra-red analyses of the products of the examples indicated combined hexafluoropropylene contents of less than 0.2 weight percent.

The specific melt viscosities of the hexafluoropropylene-modified resins of Examples 14 to 16 ranged from about 3×10$^{10}$ to 6×10$^{10}$ poises at 380° C.; for resins made under identical conditions in the absence of modifier, the specific melt viscosity was about 10×10$^{10}$ poises. The lower melt viscosity aids in the improvement of the degree of sintering obtained during a fixed thermal treatment.

EXAMPLE 24

The procedure of Example 22 was repeated except that the hexafluoropropylene was not introduced until 60 percent of the total tetrafluoroethylene to be reacted had been polymerized. The resulting product of 35 weight percent solids was obtained at an overall reaction rate of 585 grams/liter/hour, had an average particle size of 0.182 micron and an SSG of 2.179. In the extrusion performance test, it extruded at 470 kg./cm.$^2$ to yield extrudate of quality 6. Infra-red analyses of the final product and of a sample withdrawn after 70 percent of the total tetrafluoroethylene had reacted showed a combined hexafluoropropylene content of 0.05 weight percent in the outer 30 weight percent portion of the resin particles.

In a comparison run under the conditions of Example 22, except that the gaseous charge was replaced with pure tetrafluoroethylene in polymerizing the last 45 percent of the tetrafluoroethylene polymerized, resin which fractured in the extrusion test was obtained. The overall reaction rate in this comparison run was 655 grams/liter/hour; in the absence of modifier under otherwise identical conditions, the overall reaction rate was 764 grams/liter/hour.

length-to-diameter ratio of 2.9 to 1, the aqueous charge occupying one-half the reactor volume, and containing 0.05 weight percent DSP, 0.15 weight percent C$_9$AFC, and 4.1 percent of paraffin wax. The charge was pressured to 28.2 atmospheres absolute with tetrafluoroethylene containing 2 weight percent HFP, and thereafter only tetrafluoroethylene was charged. After 80 percent of the total tetrafluoroethylene was polymerized, supply of tetrafluoroethylene was stopped, the pressure allowed to decrease to 13 atmospheres absolute, and the run was then terminated. The residual gas contained 3.1 weight percent HFP. The product, of 35 weight percent solids, was obtained at an overall reaction rate of 490 grams/liter/hour, had an average particle size of 0.17 micron, and an SSG of 2.169. In the extrusion performance test, extrudate of quality 3 was obtained at 480 kg./cm.$^2$ extrusion pressure. Under identical conditions, in a tetrafluoroethylene-saturated aqueous charge, identical quantities of high molecular weight dispersion resin were obtained at a reaction rate more than 1.1 times as great. The product, however, fractured in the extrusion performance test.

EXAMPLE 26

The procedure of Example 10 was repeated except that HFP is premixed with the tetrafluoroethylene feed at a concentration of 0.9 weight percent. A product of 38.5 percent solids, having an average particle size of 0.162 micron and an SSG of 2.220, was obtained at an overall reaction rate of 529 grams/liter/hour. In the extrusion performance test, the resin yielded extrudate of quality 10 at a pressure of 290 kg./cm.$^2$. In separate tests, under the same general conditions with a smaller die, the resin gave extrudate of quality 8 at a reduction ratio of 10,000 to 1 and an extrusion pressure of 845 kg./cm.$^2$. In further analyses, the product of this example was found to have a value of $\Delta d^{1/2}/d_{av}$ of less than 0.4 and a hexafluoropropylene content of 0.1 wt. percent in the outer 30 weight percent of the resin particles.

EXAMPLES 27 AND 28

The general procedure of Examples 1 to 12 was repeated in a reactor of about the same capacity, having a length-to-diameter ratio of 2.6/1, the aqueous charge occupying half the reactor volume and being agitated at 95 r.p.m. PPTE modifier was added in the concentrations indicated, as a percent of the aqueous charge, before pressuring with tetrafluoroethylene, and thereafter only tetrafluoroethylene was added. The supply of tetrafluoroethylene was shut off during polymerization of the last 20 percent of the tetrafluoroethylene polymerized, during which time the pressure decreased to 13 atmospheres absolute. Results are summarized in Table III.

0.49 and 0.44, respectively, and the $\overline{M}_{ns}/\overline{M}_{nc}$ ratios were 4.6 and 2.3.

Table III

| Example No. | Initiator | | Reaction Temperature, °C. | Dispersing Agent | | Percent Modifier* | Percent Wax | Overall Reaction Rate, g./liter/hour | Percent Solids in Dispersion | $d_{av}$ | SSG | Extrusion Performance | |
|---|---|---|---|---|---|---|---|---|---|---|---|---|---|
| | Kind | Percent | | Kind | Percent | | | | | | | Extrusion Pressure, kg./cm.² | Extrudate Quality |
| 27 | DSP | 0.05 | 85 | C₉AFC | 0.15 | 0.012 | 6.2 | 179 | 34.9 | 0.143 | 2.223 | 670 | 8 |
| 28 | DSP | 0.05 | 85 | C₉AFC | 0.15 | 0.23 | 6.2 | 135 | 34.9 | 0.146 | 2.184 | 830 | 2 |

In comparison runs, made under identical conditions in the absence of modifier, identical quantities of high This application is a continuation-in-part of Serial Number 832,921, filed August 11, 1959.

Table IV

| Example No. | Percent Solids | $d_{av}$ | $d_{av}$ (Corrected, via Ultracentrifuge) | Distribu. Width, $\Delta d\frac{1}{2}$, μ | Space-Time Yield, g./liter/hr. | Extrusion Pressure, kg./cm.² | Quality of Extrudate | SSG | No.-avg. mol. wt. (via SSG) | Melt viscosity at 380° C. Poises | $\Delta d\frac{1}{2}/(d_{av})$ corr. | (Mol. wt.) Shell/(mol. wt.) Core |
|---|---|---|---|---|---|---|---|---|---|---|---|---|
| 29—APS Initiator: 0.009 wt. percent, 60° C.; 0.010 wt. percent methanol modifier. | 11.9 | 0.140 | | | | | | 2.250 | 1.7×10⁶ | | | |
| | 19.0 | 0.160 | | | | | | 2.246 | 2.0×10⁶ | | | |
| | 28.2 | 0.185 | | | | | | 2.246 | 2.0×10⁶ | | | |
| | 43.4 | *0.222 | 0.24 | 0.085 | 370 | 370 | 6 | 2.231 | 3.7×10⁶ | 8.5×10¹⁰ | 0.35 | 2.2 |
| 30—APS Initiator: 0.006 wt. percent, 70° C.; 0.009 wt. percent methanol modifier. | 13.0 | 0.138 | | | | | | 2.259 | 1.2×10⁶ | | | |
| | 18.7 | 0.150 | | | | | | 2.255 | 1.4×10⁶ | | | |
| | 26.5 | 0.177 | | | | | | 2.249 | 1.75×10⁶ | | | |
| | 41.4 | 0.220 | 0.26 | 0.078 | 480 | 340 | 8 | 2.234 | 3.1×10⁶ | 11.0×10¹⁰ | 0.30 | 2.45 |

*2.3% coagulum.

molecular weight dispersion resins were made at overall reaction rates 2.7 and 2.0 times as great, but fractured in the extrusion performance test. Material balances indicated the content of combined monomer other than tetrafluoroethylene in the resinous products of Examples 27 and 28 was in the range of 0.01 to 0.3 weight percent.

EXAMPLES 29 AND 30

In the following examples, the procedure of Examples 1–12 was followed except that the reactor and the degree of filling with aqueous charge of Examples 27 and 28 were used. Small samples of the liquid phase (containing the dispersed particles of colloidal polytetrafluoroethylene) were removed from the reactor at three separate times during the course of each run, in order that measurements of solids content, average particle size and SSG might be made. The polymeric product in each run was recovered and evaluated in the usual manner, including determination of the particle size distribution widths, $\Delta d\frac{1}{2}$. Results are summarized in Table IV.

EXAMPLE 31

In the following example, the procedure and conditions of Example 30 were used, except that the methanol modifier was added only after the solids content of the liquid phase of the reactor had reached 16.5 percent by weight. A sample withdrawn from the reactor just before the methanol was added had an SSG of 2.251. The high molecular weight dispersion resin produced, containing 40.0 percent solids by weight, was obtained at an overall average rate of 450 g./liter/hour, had an average particle size of 0.19 micron and an SSG=2.234. In the extrusion performance test, the resin yielded extrudate of quality 4 at an extrusion pressure of 420 kg./cm.². The resin had a $\Delta d\frac{1}{2}/d_{av}$ value of 0.47, and an $\overline{M}_{ns}/\overline{M}_{nc}$ of 2.1.

In two comparison runs made using a procedure identical with that of Example 30, but using DSP initiator and with no modifier present, and at reaction temperatures of 85° and 110° C. respectively, the products obtained in each case fractured in the extrusion performance test. The $\Delta d\frac{1}{2}/d_{av}$ values for these resins were

I claim:
1. A particulate polymeric tetrafluoroethylene resin, consisting essentially of fluoroethylene of the group consisting of tetrafluoroethylene, perfluoroalkyl trifluoroethylenes of 3 to 10 carbon atoms, and oxyperfluoroalkyl trifluoroethylenes of 3 to 10 carbons as combined monomer and comprising at least 98 weight percent combined tetrafluoroethylene, predominantly comprising spheroidal particles 0.05 to 0.5 micron in diameter, having an average particle diameter in the range of 0.12 to 0.35 micron, a standard specific gravity of less than 2.235, and a specific melt viscosity of at least $1 \times 10^9$ poises at 380° C., said resin being one obtained by subjecting tetrafluoroethylene to polymerizing conditions of temperature and pressure in an aqueous medium having dissolved therein a free-radical polymerization initiator, a dispersing agent, and, present at least during and coextensively with the polymerization of the final 30 percent of the tetrafluoroethylene polymerized, a modifier in amounts ineffective to prevent resin having the aforesaid characteristics from being obtained, but cumulatively effective to maintain the overall rate of polymerization at least 5 percent below that obtaining for the polymerization of an equal quantity of tetrafluoroethylene in an identical reaction medium continuously saturated with tetrafluoroethylene at the same temperature and pressure in the absence of said modifier, said modifier being selected from the group consisting of non-polymerizable chain transfer agents containing at least one covalently-bound non-metallic monovalent atom other than fluorine, perfluoroalkyl trifluoroethylene of 3 to 10 carbon atoms, and oxyperfluoroalkyl trifluoroethylenes of 3 to 10 carbon atoms.

2. A particulate polytetrafluoroethylene resin, predominantly comprising spheroidal particles 0.05 to 0.5 micron in diameter, having an average particle diameter in the range of 0.12 to 0.35 micron, a standard specific gravity of less than 2.235, a specific melt viscosity of at least $1 \times 10^9$ poises at 380° C., a ratio, to average particle diameter, of the spread in particle diameters at the half-peak concentrations of particle size by weight, of less than 0.40, and a ratio of number average molecular weight of the shell half to number average molecular weight of the core half of the resin particles of less than 3.5.

3. A particulate polymeric tetrafluoroethylene resin predominantly comprising spheroidal particles 0.05 to 0.5 micron in diameter, having an average particle diameter in the range of 0.12 to 0.35 micron, a standard specific gravity of less than 2.235, and a specific melt viscosity of at least $1 \times 10^9$ poises at 380° C., said resin consisting essentially of tetrafluoroethylene and hexafluoropropylene as combined monomer and comprising at least 98 weight percent combined tetrafluoroethylene, and at least in the outer 30 weight percent of the resin particles, a combined hexafluoropropylene content in the range of 0.01 to 0.3 weight percent as determined by infra-red measurement.

4. A particulate polymeric tetrafluoroethylene resin, predominantly comprising spheroidal particles 0.05 to 0.5 micron in diameter, having an average particle diameter in the range of 0.12 to 0.35 micron, a standard specific gravity of less than 2.235, a specific melt viscosity of at least $1 \times 10^9$ poises at 380° C., and a ratio, to average particle diameter, of the spread in particle diameters at the half-peak concentrations of particle size by weight, of less than 0.40, said resin consisting essentially of tetrafluoroethylene and hexafluoropropylene as combined monomer and comprising at least 98 weight percent combined tetrafluoroethylene and, at least in the outer 30 weight percent of the resin particles, a combined hexafluoropropylene content in the range of 0.01 to 0.3 weight percent as determined by infra-red measurement.

5. A particulate polymeric tetrafluoroethylene resin, consisting essentially of fluoroethylene selected from the group consisting of tetrafluoroethylene, perfluoroalkyl trifluoroethylenes of 3 to 10 carbon atoms, and oxyperfluoroalkyl trifluoroethylenes of 3 to 10 carbon atoms as combined monomer and comprising at least 98 weight percent combined tetrafluoroethylene, predominantly comprising spheroidal particles 0.05 to 0.5 micron in diameter, having an average particle diameter in the range of 0.12 to 0.35 micron, a standard specific gravity of less than 2.235, and a specific melt viscosity of greater than $1 \times 10^9$ poises at 380° C., said resin having the capacity when blended in weight proportions of 81 to 19 with a saturated hydrocarbon of 10 to 11 carbon atoms having a viscosity of about 1.36 centipoises at 25° C., to be extruded at 30° C. at a rate of 23.5 grams per minute through a die conically tapering at an apex angle of 60° to a cylindrical orifice 0.08 cm. in internal diameter and 0.038 cm. in axial length, at a reduction ratio of 1600/1 into a continuous extrudate.

6. A process which comprises subjecting tetrafluoroethylene to polymerizing conditions of temperature and pressure in an aqueous medium having dissolved therein a free-radical polymerization initiator and a dispersing agent, said conditions being effective in said medium in the absence of other dissolved material to polymerize the tetrafluoroethylene and recovering a particulate polymeric tetrafluoroethylene resin predominantly comprising spheroidal particles 0.05 to 0.5 micron in diameter, having an average particle diameter in the range of 0.12 to 0.35 micron, a standard specific gravity of less than 2.235, a specific melt viscosity of at least $1 \times 10^9$ poises at 380° C. and a combined tetrafluoroethylene content of at least 98 weight percent characterized in that said medium also contains dissolved therein present at least during and co-extensively with the polymerization of the final 30 percent of the tetrafluoroethylene polymerized, a modifier, in amounts ineffective to prevent resin having the aforesaid characteristics from being obtained but cumulatively effective to maintain the overall rate of polymerization at least 5 percent below that obtaining for the polymerization of an equal quantity of tetrafluoroethylene in an identical reaction medium continuously saturated with tetrafluoroethylene at the same temperature and pressure in the absence of said modifier, said modifier being selected from the group consisting of non-polymerizable chain transfer agents containing at least one covalently-bound non-metallic monovalent atom other than fluorine, perfluoroalkyl trifluoroethylenes at 3 to 10 carbon atoms, and oxyperfluoroalkyl trifluoroethylenes of 3 to 10 carbon atoms.

7. A process according to claim 6 wherein said modifier as added consists of methanol.

8. A process according to claim 6 wherein said modifier as added consists of hexafluoropropylene.

9. A process according to claim 6 wherein said modifier as added consists of a mixture of methanol and hexafluoropropylene.

10. A process according to claim 8 wherein the hexafluoropropylene is present only during the polymerization of the final half of the tetrafluoroethylene polymerized.

11. A process according to claim 7 wherein the methanol is present only during the polymerization of the final half of the tetrafluoroethylene polymerized.

References Cited in the file of this patent
UNITED STATES PATENTS

| 2,549,935 | Sauer | Apr. 24, 1951 |
| 2,750,350 | Kroll | June 12, 1956 |
| 2,965,595 | Brinker et al. | Dec. 20, 1960 |
| 2,965,619 | Honn | Dec. 20, 1960 |
| 3,010,950 | Thomas | Nov. 28, 1961 |

FOREIGN PATENTS

| 789,786 | Great Britain | Jan. 29, 1958 |

OTHER REFERENCES

Dixon et al.: Ind. and Eng. Chem., volume 49, No. 10, pages 1687–1690, October 1957.